(12) United States Patent
Sugahara et al.

(10) Patent No.: US 7,955,042 B2
(45) Date of Patent: Jun. 7, 2011

(54) MANIPULATOR

(75) Inventors: Atsushi Sugahara, Kanagawa-ken (JP);
Hideichi Nakamoto, Kanagawa-ken (JP); Takashi Yoshimi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 12/200,199

(22) Filed: Aug. 28, 2008

(65) Prior Publication Data

US 2009/0074554 A1      Mar. 19, 2009

(30) Foreign Application Priority Data

Aug. 31, 2007   (JP) ................................. 2007-226992

(51) Int. Cl.
*B25J 19/00*      (2006.01)
(52) U.S. Cl. .............. 414/729; 901/27; 901/29; 901/30; 74/490.01; 74/490.06
(58) Field of Classification Search ................... 414/729; 901/15, 16, 227, 28, 29, 50, 27, 30; 74/490.01, 74/490.05, 490.06
See application file for complete search history.

(56) References Cited

U.S. PATENT DOCUMENTS 4,904,514 A * 2/1990 Morrison et al. ................ 428/53
7,422,773 B2 * 9/2008 D'Andreta .................... 427/483

FOREIGN PATENT DOCUMENTS

| JP | 09-296312 | 11/1997 |
| JP | 2005-279101 | 10/2005 |
| JP | 2006-000294 | 1/2006 |

* cited by examiner

*Primary Examiner* — Donald Underwood
(74) *Attorney, Agent, or Firm* — Turocy & Watson, LLP (57) ABSTRACT

A manipulator includes an end effector, a support member that supports the end effector, and a fixing member provided to the support member and made of a tube-shaped flexible film with a space therein. In the manipulator, a fluid is supplied to the space of the fixing member to inflate the fixing member so that a flexible cover for covering the end effector is fixed to the support member. Accordingly, cleanness of the end effector is restored.

5 Claims, 11 Drawing Sheets

MANIPULATOR

CROSS REFERENCE TO RELATED APPLICATIONS

The present application is based on and claims priority from Japanese Patent Application No. 2007-226992, filed on Aug. 31, 2007, the disclosure of which is hereby incorporated by reference herein in its entirety.

BACKGROUND OF THE INVENTION

1. Field of the Invention

The present invention relates to a manipulator.

2. Description of the Related Art

A manipulator is used in a hospital, a nursing-care facility, a restaurant, home, etc. When an intended work is performed with a manipulator, a work subject such as chemicals, food or the like is sometimes deposited on an end effector part of the manipulator, and thus the end effector part might require cleaning, as described in Japanese Patent Application Publication No. 2005-279101.

However, the manipulator described in Japanese Patent Application Publication No. 2005-279101 has many movable parts and thus needs to have a structure to facilitate cleaning when highly clean work should be performed with the manipulator.

Moreover, since a work using the manipulator is impossible during the cleaning thereof, it is difficult to increase the utilization rate of the manipulator when highly clean work should be performed therewith.

Furthermore, even when highly clean work need not be performed with the manipulator, if a work subject is deposited and accumulated on a sensor used for controlling the end effector part, such as a contact sensor for detecting a contact state between the end effector and the work subject, this might affect sensitivity and errors of the sensor.

SUMMARY OF THE INVENTION

In view of the aforementioned circumstances, an object of the present invention is to provide a manipulator capable of recovering cleanness of an end effector part simply and in a short period of time.

A manipulator of the present invention includes an end effector that performs a mechanical work on a work subject; a support member that supports the end effector; an expandable and contractible fixing member provided to the support member and having a first space; and first fluid supply means for supplying fluid to the first space. The manipulator is configured to fix a flexible cover for covering the end effector to the support member by supplying the fluid to the first space to increase a size of the fixing member.

According to the present invention, it is possible to provide a manipulator capable of recovering cleanness of an end effector part simply and in a short period of time.

BRIEF DESCRIPTION OF THE DRAWINGS

FIGS. 1A to 1F are views showing a first embodiment of a manipulator according to the present invention.

DETAILED DESCRIPTION OF THE PREFERRED EMBODIMENTS

The following will explain embodiments of the present invention with reference to the drawings.

First Embodiment

FIGS. 1A to 1F show a first embodiment of a manipulator according to the present invention.

Figure 1A:
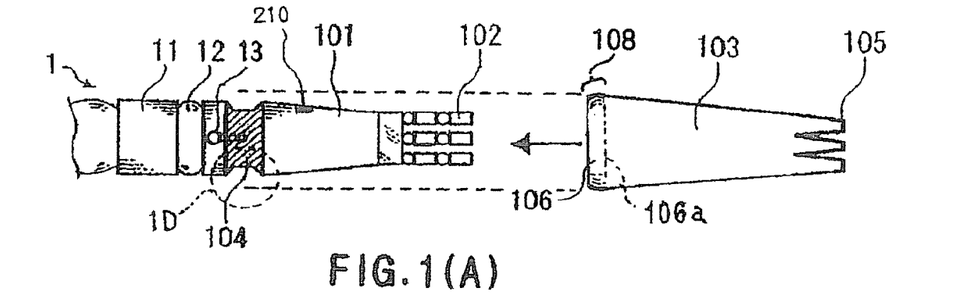
FIGS. 1A and 1B are views each showing a bottom.
Figure 1B:
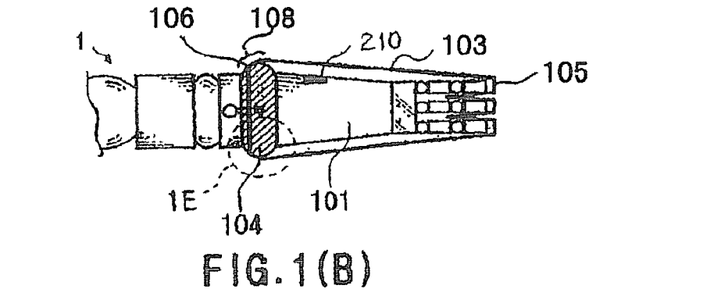
Figure 1C:
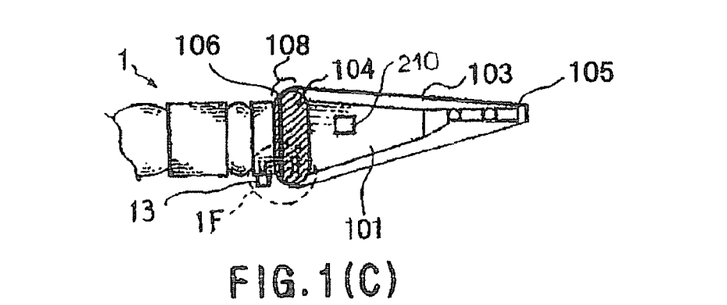
FIG. 1C is a side view.

A manipulator 1 includes a support member 101 and an end effector 102 supported by the support member 101 with respect to a robot arm 11.

The arm 11 is part of a revolute robot arm provided on an unillustrated robot caused to perform a predetermined work on a work subject.

The support member 101 is provided at a tip portion of the arm 11 and is physically connected to the arm 11 and the end effector 102. A movable part 12 is provided between the arm 11 and the support member 101. The movable part 12 is provided to rotate the end effector 102 around an axis of a longitudinal direction of the arm 11. A marker 210 used for operating a dispenser to be described later is attached to a side surface of the support member 101.

The end effector 102 is a robot hand having multiple bendable and stretchable finger members. The end effector 102 is configured to perform a predetermined work on a work subject. The end effector 102 can "grasp" and "release" the work subject.

An outer peripheral surface of the support member 101 and that of the end effector 102 are formed so as to attach a bag-like and flexible cover 103. A fixing ring portion 106a is provided around an insertion port 106 of the flexible cover 103, and the fixing ring portion 106a is a seamless belt-like portion, and has tension such that its circumferential length is not changed by an external pressure.

In this example, the flexible cover 103 is made of polyvinyl and has the insertion port 106 having a diameter of 10 cm and a thickness of 0.02 mm. However, the material of the flexible cover 103 may include, for example, silicone rubber, neoprene rubber, butadiene rubber, natural rubber, polyethylene, polypropylene, polyester, vinyl chloride, or cloth (a fabric or nonwoven fabric) impregnated or coated with these materials and then subjected to airtight processing.

The flexible cover 103 has a glove-like bag shape conforming to the shapes of the finger members of the end effector 102 serving as a robot hand. In other words, the flexible cover 103 has a bag shape with a closed tip portion 105 and the insertion port 106, which is opened, and the fixing ring portion 106a formed around the insertion port 106. The flexible cover 103 is shaped in such a manner that the width of the bag (section size obtained by cutting the bag in round slices) is gradually increased from the tip portion 105 to the insertion port 106. As shown in FIG. 1C, the section size gradually increases toward the insertion port 106 even when the flexible cover 103 is seen from a side surface. In addition, the flexible cover 103 has no constricted part on its outer shape, and is hardly caught by the other member at the time of attachment and detachment of the flexible cover 103. Therefore, the flexible cover 103 can be easily attached and detached to and from the support member 101 and the end effector 102 through the insertion port 106.

A fixing member 104 is provided on the support member 101. The fixing member 104 is configured to attach or remove the flexible cover 103 to or from the support member 101.

Figure 1D:
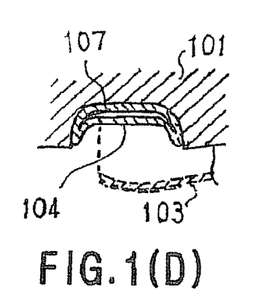
FIG. 1D is a cross-sectional view of part 1D in FIG. 1A.
Figure 1E:
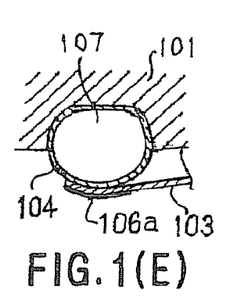
FIG. 1E is a cross-sectional view of part 1E in FIG. 1B.
Figure 1F:
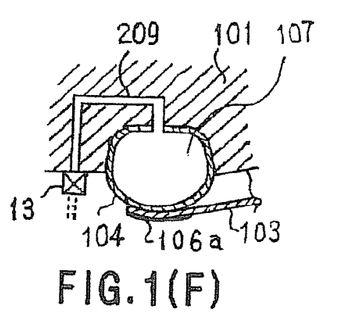
FIG. 1F is a cross-sectional view of part 1F in FIG. 1C.

Details on the fixing member 104 will be given with reference to FIGS. 1D to 1F. FIG. 1D shows a cross section of a circled 1D portion in FIG. 1A, FIG. 1E shows a cross section of a circled 1E portion in FIG. 1B, and FIG. 1F shows a cross section of a circled 1F portion in FIG. 1C.

The fixing member 104 is a tube-shaped airtight member made of a flexible film and having a first space 107, and is provided around a ring-like constriction portion formed in the support member 101 so that the first space 107 can be provided on the support member 101. In this example, the fixing member 104 is made of vinyl chloride. Moreover, the fixing member 104 is provided so that a surface, adjacent to the support member 101, of the flexible film can adhere to the support member 101 to seal between the flexible film and the support member 101.

When the first space 107 has a small amount of air, the fixing member 104 is accommodated in the ring-like constriction portion formed in the outer periphery of the support member 101 as shown in FIG. 1D. On the other hand, when air is filled in the first space 107, the fixing member 104 is inflated as shown in FIGS. 1E and 1F to increase the outer peripheral dimension thereof. The fixing member 104 is configured to fix the flexible cover 103 to the support member 101 by increasing the outer peripheral dimension thereof, and thus by pressing the fixing ring portion 106a of the flexible cover 103 from inside the insertion port 106.

The support member 101 is provided with first fluid supply means 13 for supplying a fluid to the first space 107. The first fluid supply means 13 communicates with the first space 107 through a passage 209 as shown in FIG. 1F. The first fluid supply means 13 includes a connector with a stop valve.

In short, as shown in FIG. 1B, the fixing member 104 is provided such that a situation just like increasing the section size of the support member 101 can be obtained when the fluid is supplied to the first space 107. The fixing member 104 may be partially formed of a flexible film. When the fluid is supplied to the first space 107, the fixing member 104 formed of the flexible film is inflated to expand a gap between the support member 101 and the outer flexible film. As a result, the circumferential length of the fixing member 104 is increased to reach the circumference of the insertion port 106 of the flexible cover 103 so that the flexible cover 103 can be fixed to the support member 101.

Additionally, in FIG. 1B, the flexile cover 103 has a portion 108 where the diameter of the insertion port 106 is reduced as being apart from the tip portion 105. This is because the circumferential length of the fixing member 104 is increased enough to deform the flexible cover 103 in accordance with the shape of the fixing member 104.

By attaching the flexible cover 103 to the support member 101 and the end effector 102 as described above, it is possible to prevent a work subject and a foreign matter deposited onto the work subject from being directly deposited on the end effector 102. Moreover, it is possible to suppress deposition, on the work subject, of a foreign matter produced from the end effector 102, such as dust caused by wear of the movable part 12 or an excess of a lubricant supplied to the movable part 12.

Next, an explanation will be given of an example of a device (dispenser 201) for inserting the support member 101 and the end effector 102 into the insertion port 106 of the flexible cover 103, by using FIGS. 2 to 5.

Figure 2:
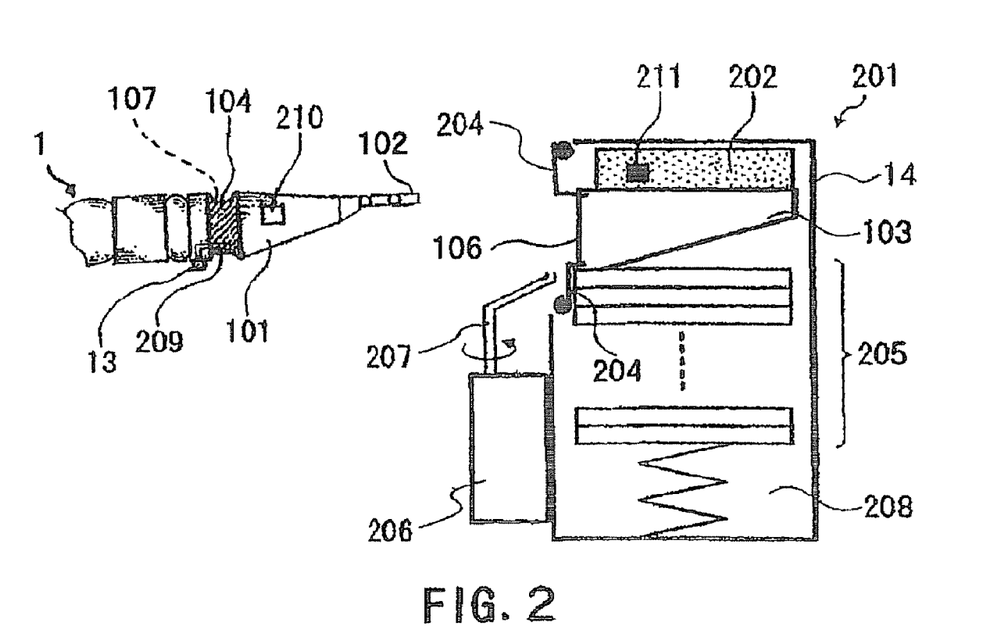
FIG. 2 is a view showing a dispenser according to the first embodiment of the manipulator according to the present invention.

The dispenser 201 is composed of mainly a housing 14 that contains multiple flexible covers 103, an elastic member 208 which is provided in a lower portion inside the housing 14 and which is a spring for upwardly pushing the multiple piled-up flexible covers 103 (bundles 205 of flexible covers 103), and adsorption means 202 which is provided in an upper portion inside the housing 14 so as to adsorb an upper surface of the uppermost flexible cover 103 among the flexible covers 103 upwardly pushed by the elastic member 208.

The adsorption means 202 adsorbs part of the flexible cover 103, which is placed at the farthest position from the elastic member 208, by a gas adsorption force. The part of the flexible cover 103 is adsorbed and, therefore the insertion port 106 is expanded widely.

The housing 14 further includes a claw member 204 provided to engage the insertion port 106 expanded by the adsorption means 202. In addition, the claw member 204 is rotatably provided to release the engagement with the insertion port 106. The mechanism of the claw member 204 is not limited to the rotation mechanism. Namely, the claw member 204 may be moved to release the engagement with the insertion port 106.

As a result of the engagement by the claw member 204, the insertion port 106 of the adsorbed flexible cover 103 is expanded more widely. The opening of the insertion port 106 of the flexible cover 103 facilitates insertion of the support member 101 and the end effector 102 into the insertion port 106 of the flexible cover 103.

On the side surface of the housing 14 of the dispenser 201, there is provided a fluid supply pipe 207 which is detachably provided to the first fluid supply means 13. The fluid supply pipe 207 is provided to be rotatable around the axis thereof. In this configuration, when the support member 101 and the end effector 102 are inserted into the flexible cover 103, the first fluid supply means 13 is connected to the fluid supply pipe 207, and air is supplied to the first space 107 by a fluid supply source 206 having an air pump, which is used as a main component, and which is connected to the fluid supply pipe 207.

An explanation will be given of a method of fixing the flexible cover 103 to the support member 101 using the dispenser 201, with reference to FIGS. 3 to 5.

Figure 3:
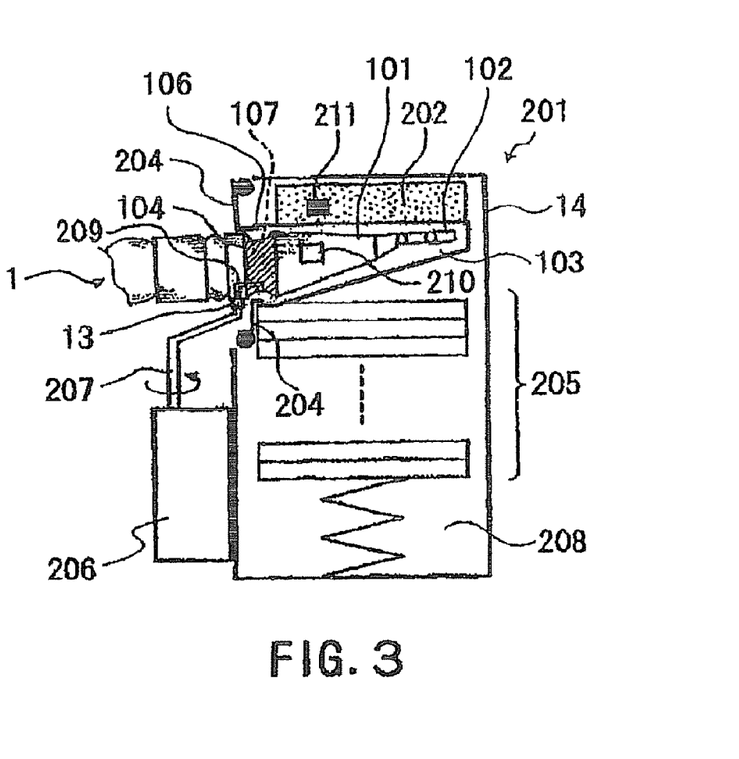
FIG. 3 is a view showing the dispenser according to the first embodiment of the manipulator according to the present invention.

First, as show in FIG. 3, the support member 101 and the end effector 102 are inserted into the expanded insertion port 106 of the flexible cover 103. A positional relationship between the flexible cover 103 and the support member 101 is detected the marker 210 by use of a magnetic sensing type marker sensor 211 provided on the side surface of the adsorption means 202. The marker 210 attached on the side surface of the support member 101 is made of a permanent magnet adhered onto the side surface of the support member 101. Based on the detected positional relationship, the support member 101 and the end effector 102 are inserted up to a position where the flexible cover 103 can be fixed by the fixing member 104. The mechanism for controlling the insertion operation of the support member 101 and the end effector 102 by means of the detection of the marker sensor 211 is configured to control the robot arm 11 to be placed at a predetermined position based on a detection result obtained through an unillustrated electric circuit. In addition, the detection method using the marker 210 and the marker sensor 211 is not limited to the method based on the magnetic force, and a known method using an image, capacitance, an eddy current, an ultrasonic wave or the like may be used.

In a state shown in FIG. 3, the first space 107 has a small amount of fluid, and a constriction portion is formed in such a manner that the circumferential length of the fixing member 104 is shorter than at least the inner circumferential length of the expanded insertion port 106, and ideally shorter than the circumferential length of the portion where the fixing member 104 of the support member 101 is provided. Since the amount of fluid in the first space 107 is low, the support member 101 and the end effector 102 can be inserted until the edge of the flexible cover 103 reaches the portion of the fixing member 104 to be engaged.

After the support member 101 and the end effector 102 are inserted up to the position where the flexible cover 103 can be fixed by the fixing member 104, the first fluid supply means 13 and the fluid supply pipe 207 are connected to each other. After the connection between the first fluid supply means 13 and the fluid supply pipe 207, the stop valve is opened in linkage with the connection since the stop valve is provided in the first fluid supply means 13. When the stop valve is opened, the first space 107 and the fluid supply source 206 therefore communicate with each other. It should be noted that an electromagnetic valve may be separately provided in the passage 209, in place of the stop valve. In the case of the electromagnetic valve, the electromagnetic valve may be provided to open in accordance with an instruction given by the electric circuit separately, when the first space 107 and the fluid supply source 206 communicate with each other.

Figure 4:
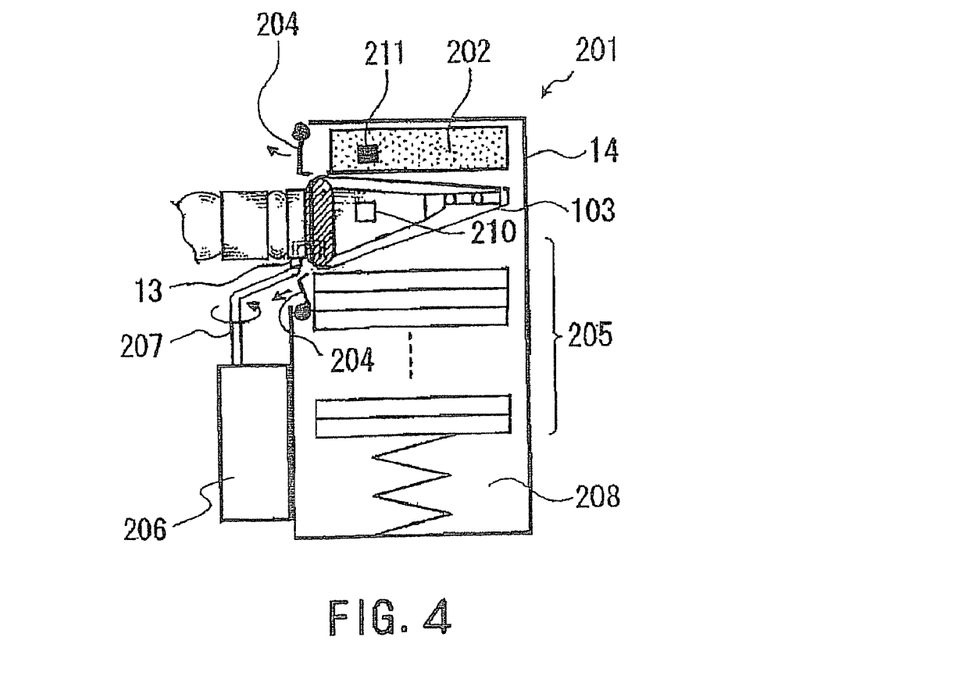
FIG. 4 is a view showing the dispenser according to the first embodiment of the manipulator according to the present invention.

Next, as shown in FIG. 4, the claw member 204 is moved or rotated to release the engagement with the insertion port 106. By releasing the engagement between the claw member 204 and the insertion port 106, the claw member 204 is removed from between the fixing member 104 and the insertion port 106.

After releasing the engagement between the claw member 204 and the insertion port 106, air is supplied to the first space 107 from the fluid supply source 206. By supplying air to the first space 107, the circumferential length of the fixing member 104 is increased to fix the flexible cover 103 to the support member 101.

Figure 5:
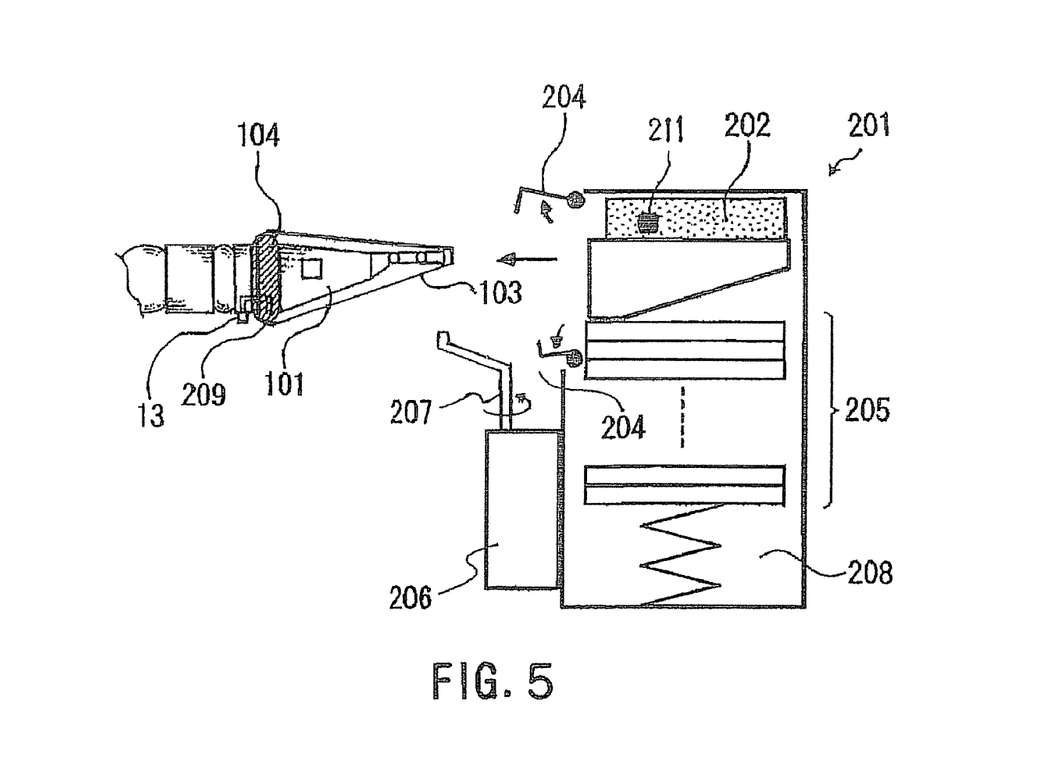
FIG. 5 is a view showing the dispenser according to the first embodiment of the manipulator according to the present invention.

Sequentially, as shown in FIG. 5, the connection between the first fluid supply means 13 and the fluid supply pipe 207 is released. In linkage with the release, the stop valve provided in the first fluid supply means 13 is closed. By closing the stop valve, even when the communication state between the first space 107 and the fluid supply source 206 is released, the fluid supplied to the first space 107 is not discharged from the first fluid supply means 13 and is held with the flexible cover 103 fixed to the support member 101. Additionally, in a case where the valve such as the electromagnetic valve is separately provided in the passage 209, the valve is configured to be closed before releasing the connection.

After releasing the connection between the first fluid supply means 13 and the fluid supply pipe 207, the support member 101 and the end effector 102 are pulled out from the dispenser 201. According to the aforementioned process, the fixing of the flexible cover 103 to the support member 101 is completed.

As explained above, the manipulator 1 according to the first embodiment of the present invention can easily cover the end effector 102 with the flexible cover 103 and, therefore the flexible cover 103 can be easily replaced. Namely, it is possible to provide the manipulator 1 capable of recovering cleanness of the end effector 102 simply and in a short period of time by easily replacing the flexible cover 103.

Second Embodiment

Figure 6A:
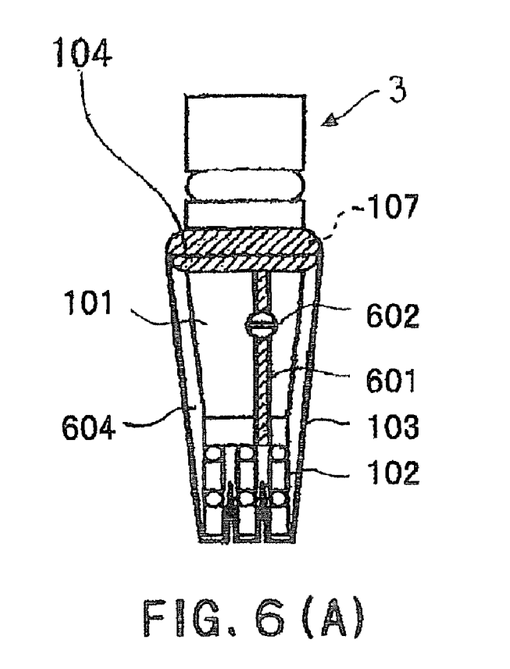
FIGS. 6A and 6B are views showing a second embodiment of a manipulator according to the present invention.
Figure 6B:
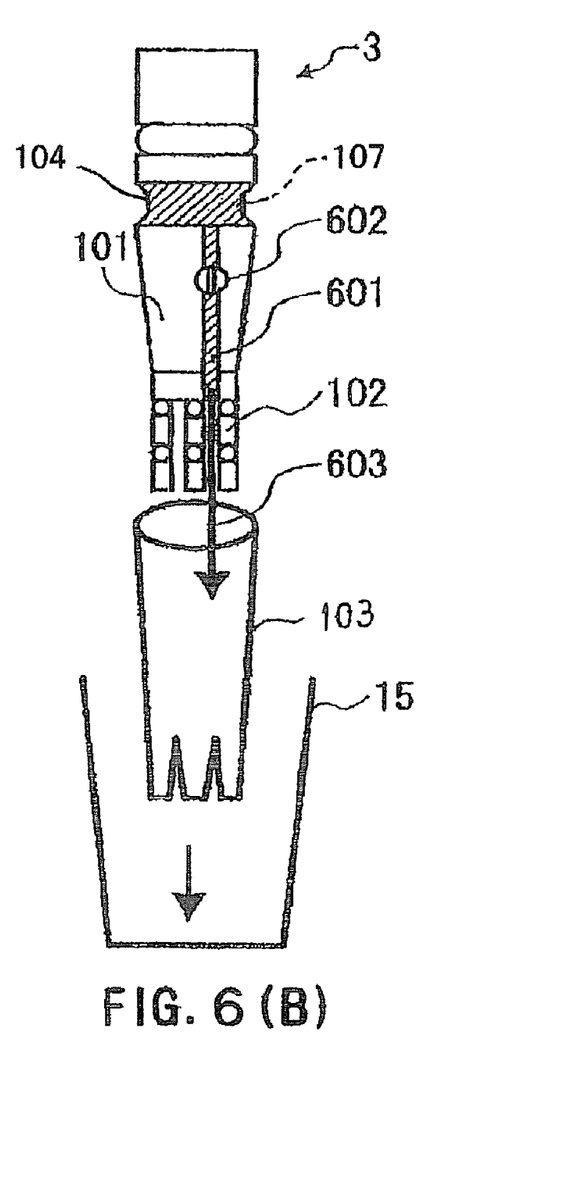

FIGS. 6A to 6B show a second embodiment of a manipulator according to the present invention.

A manipulator 3 of the present embodiment is one in which a function of detaching the flexible cover 103 from the end effector 102 is added to the manipulator 1 of the first embodiment.

The following will explain the details with reference to FIGS. 6A and 6B.

The support member 101 is provided with a valve 602. The valve 602 communicates with the first space 107 through the passage 601. The valve 602 is provided in such a manner that a fluid (air) supplied to the first space 107 is discharged when the valve 602 is opened.

Moreover, the valve 602 is provided for the fluid discharged by opening the valve 602 in order to be discharged to a second space 604 between the end effector 102 and the flexible cover 103 through a passage 601.

By changing the valve 602 from its closed state to its open state, at least part of the fluid supplied to the first space 107 is moved to the second space 604 to increase the pressure in the second space 604. The increase in the pressure causes a force for detaching the flexible cover 103 from the end effector 102 to act on the flexible cover 103. At the same time, the pressure in the first space 107 is decreased and the circumferential length of the fixing member 104 is also decreased, so that a force to fix the fixable cover 103 to the fixing member 104 weakens. When movement of the fluid progresses and the detaching force acting on the flexible cover 103 exceeds the fixing force, the flexible cover 103 is detached from the end effector 102. In addition, an electromagnetic valve which is electrically openable and closable by an unillustrated electric circuit is used as the valve 602.

The detached flexible cover 103 is collected using a collection box 15 separately provided.

As explained above, the manipulator 3 of the second embodiment of the present invention has an effect of facilitating detachment of the flexible cover 103 in replacing the flexible cover 103 in addition to the same effect as that of the first embodiment of the present invention. Namely, it is possible to provide the manipulator 3 capable of recovering cleanness of the end effector 102 simply and in a short period of time by easily replacing the flexible cover 103.

Third Embodiment

Figure 7A:
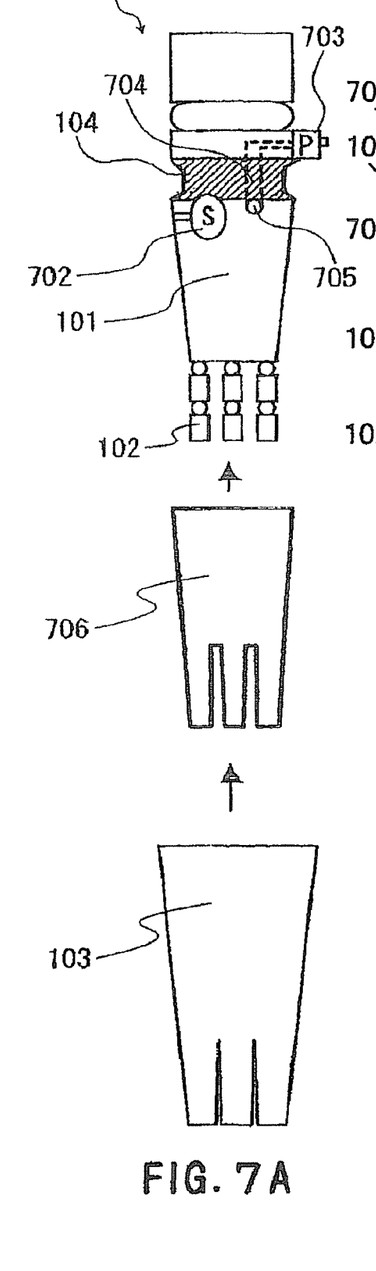
FIGS. 7A to 7C are views showing a third embodiment of a manipulator according to the present invention.
Figures 7B, 7C:
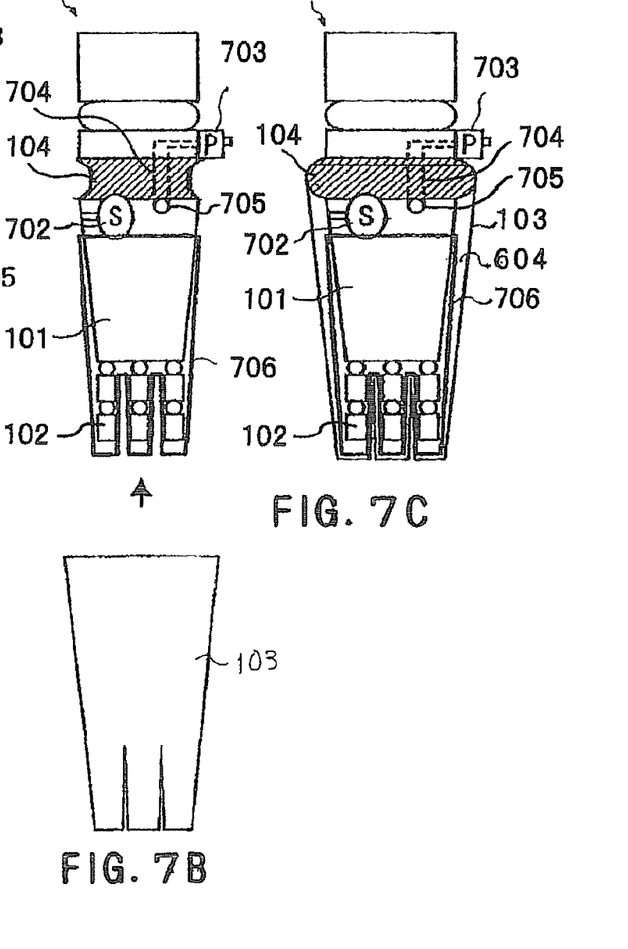

FIGS. 7A to 1C show a third embodiment of a manipulator according to the present invention.

A manipulator 4 of the present embodiment is one in which a function of detecting that an object 901 contacts a portion covered with the flexible cover 103 is added to the manipulator 1 of the first embodiment.

The following will explain the details with reference to FIGS. 7A to 11.

At least part of the support member 101 and the end effector 102 are covered with an inner cover 706. The same material as that of the flexible cover 103 is used for the inner cover 706. It should be noted that the material of the inner cover 706 does not have to be the same as that of the flexible cover 103, and can be properly selected according to the purpose of use. However, the inner cover 706 is stopped and fixed at a middle part of the tapered support member 101 with the circumference of an opening of the inner cover 706, and therefore it is better to use material having higher elasticity with respect to the circumferential length than that of the flexible cover 103.

The support member 101 is provided with a pressure sensor 702 for detecting the pressure in the second space 604 between the flexible cover 103 and the inner cover 706.

Moreover, in a passage 704 for communicating an external world and the second space 604 with each other, there is provided pressure adjusting means 703 for controlling the pressure in the second space 604. A bidirectional air pump capable of switching the direction between fluid adsorption and discharging is used as the pressure adjusting means 703. An opening 705 of openings of the passage 704 is opened at a position communicating with the second space 604.

Figure 8A:
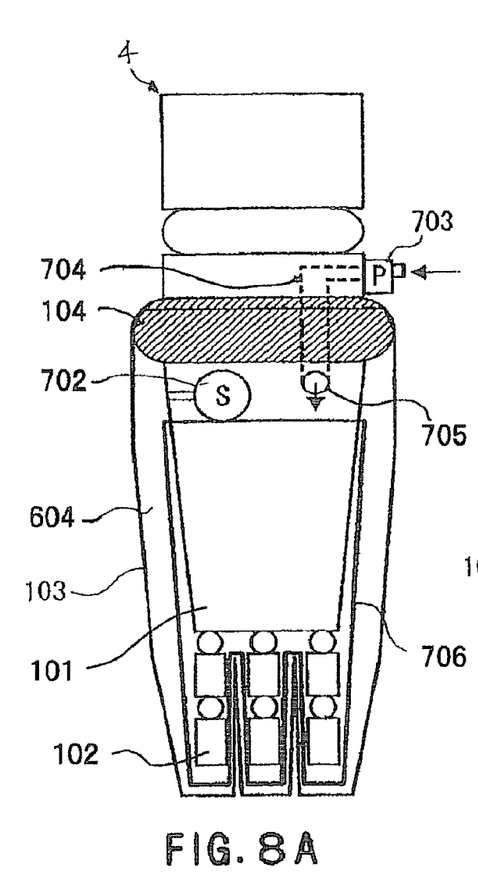
FIGS. 8A and 8B are views showing a use example of the third embodiment of the manipulator according to the present invention.
Figure 8B:
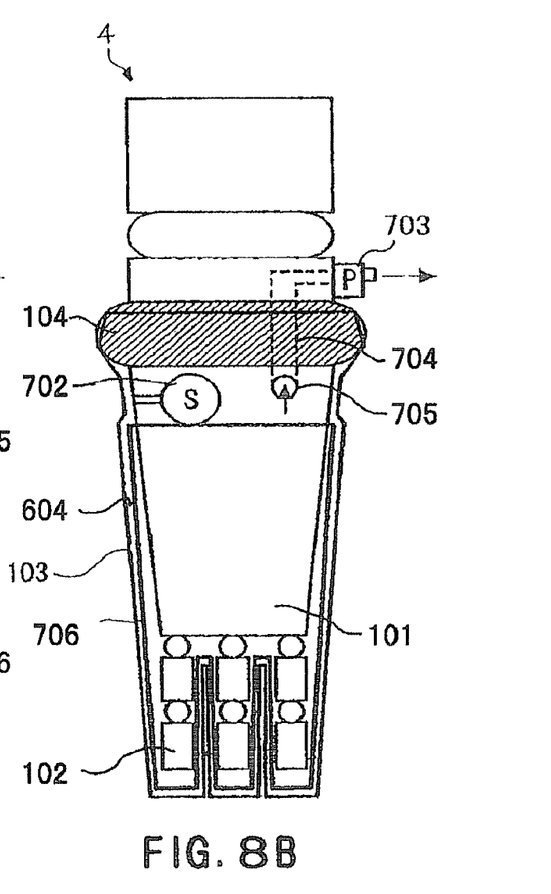

When the pressure in the second space 604 is increased by using the pressure adjusting means 703, a volume of the second space 604 is increased to inflate the flexible cover 103 as shown in FIG. 8A. On the other hand, when the pressure in the second space 604 is decreased by using the pressure adjusting means 703, the volume of the second space 604 is decreased so that the flexible cover 103 adheres to the end effector 102 covered with the inner cover 706 as shown in FIG. 8B.

Figure 9:
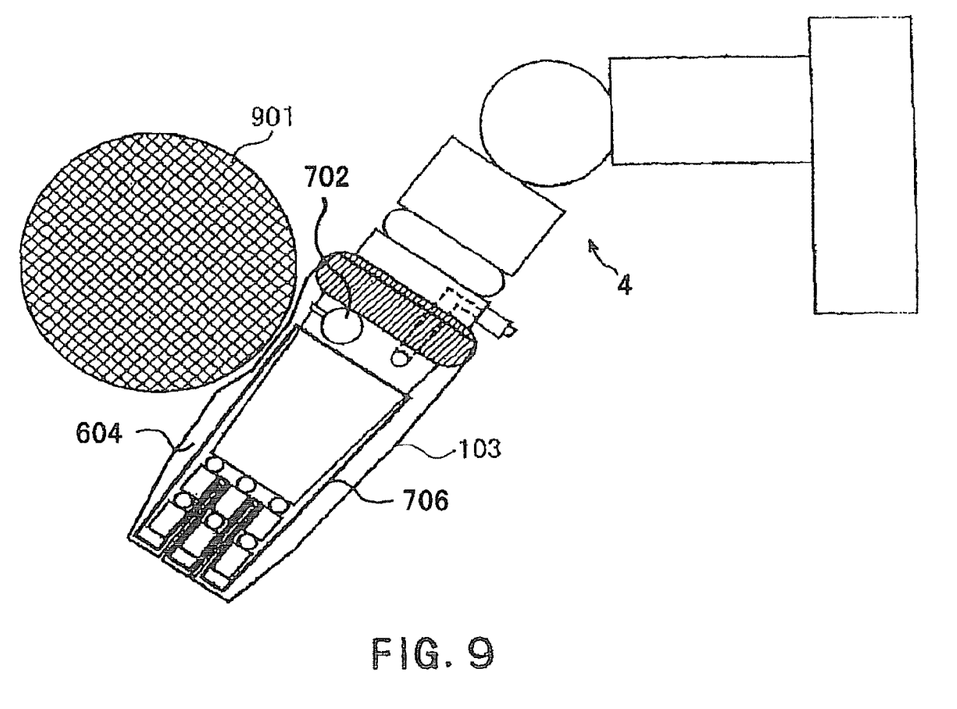
FIG. 9 is a view showing detection of a contact of an object in the third embodiment of the manipulator according to the present invention.
Figure 10:
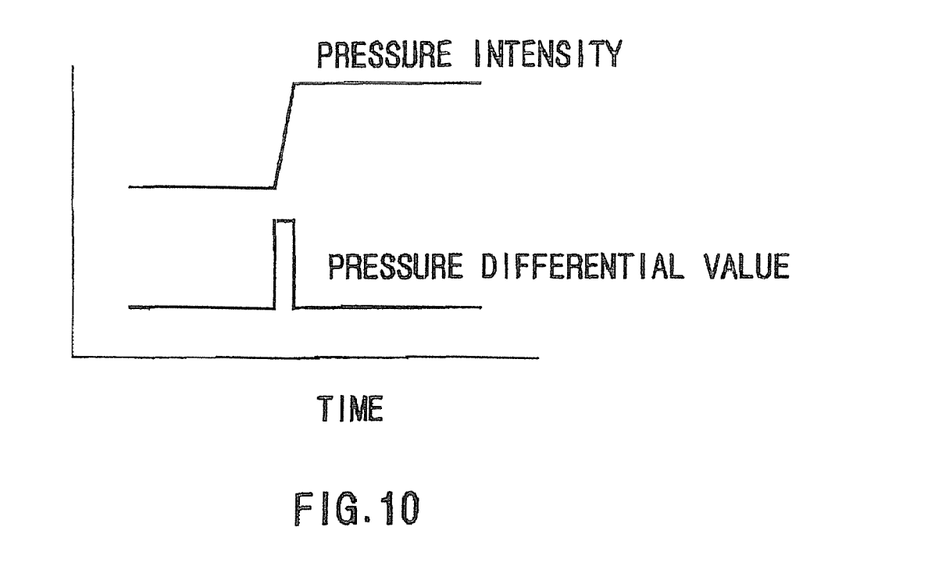
FIG. 10 is a view showing detection of the contact of the object in the third embodiment of the manipulator according to the present invention.

Suppose a case where the flexible cover 103 is inflated, the object 901 comes in contact therewith as shown in FIG. 9, and then the flexible cover 103 is deformed. As a result, the pressure in the second space 604 is changed and the pressure detected by the pressure sensor 702 and its differential value are changed as shown in FIG. 10. Moreover, the pressure increases during the time when the object 901 contacts the flexible cover 103, and the differential value increases when the object 901 comes in contact.

As explained above, the manipulator 4 of the third embodiment of the present invention has an effect of serving as a bumper against the end effector 102, when the flexible cover 103 is inflated, to make it possible to alleviate an impact caused by the contact of the object 901, in addition to the same effect as the first embodiment of the present invention. Then, the contact state of the object 901 can be detected from the output of the pressure sensor 702.

On the other hand, when the flexible cover 103 adheres to the end effector 102 covered with the inner cover 706, the apparent hardness of the surface of the end effector 102 is increased so that accurate work can be performed by the manipulator 4, for example, the work subject can be grasped more securely.

Figure 11:
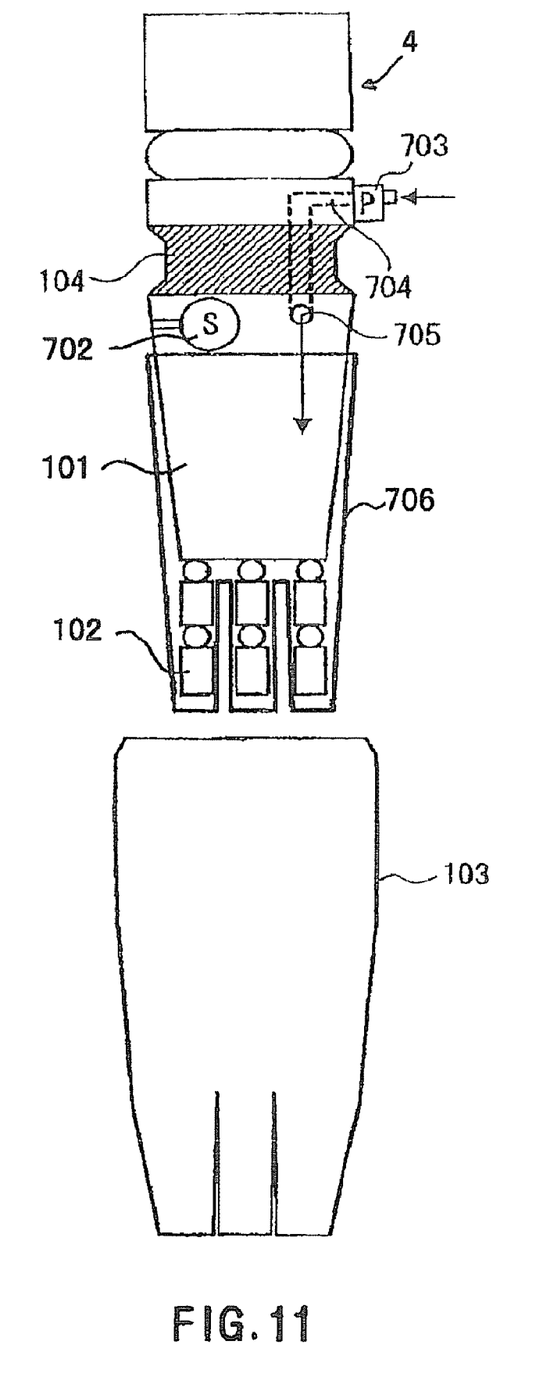
FIG. 11 is a view showing a third embodiment of the manipulator according to the present invention.

Moreover, as shown in FIG. 11, the pressure in the second space 604 between the flexible cover 103 and the inner cover 706 is increased by the pressure adjusting means 703, and at the same time the fluid of the first space 107 of the fixing member 104 is discharged. As a result, similar to the second embodiment, it is possible to easily detach the flexible cover 103 for replacement thereof.

Fourth Embodiment

Figure 12:
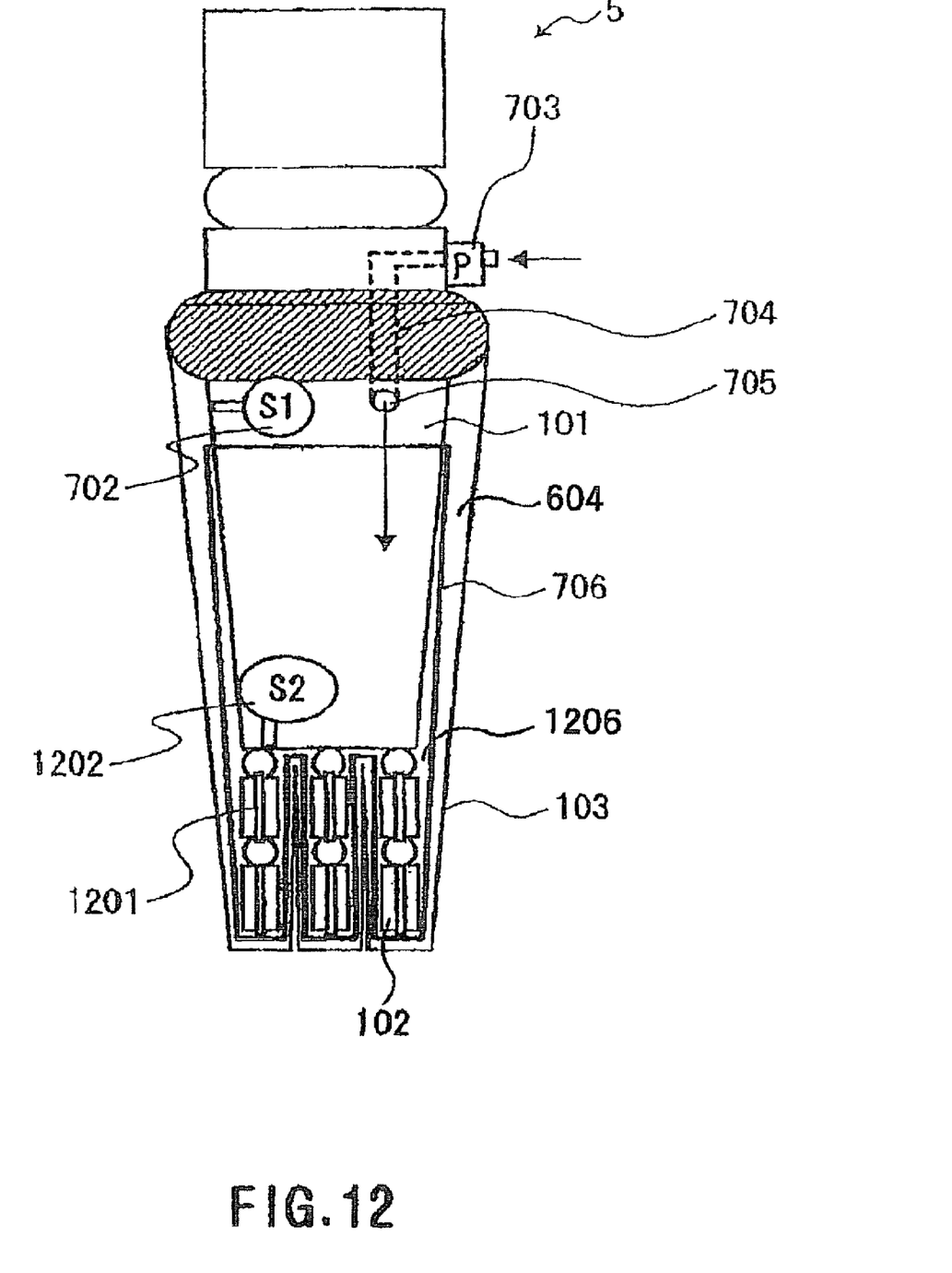
FIG. 12 is a view showing a fourth embodiment of a manipulator according to the present invention.

FIG. 12 shows a fourth embodiment of a manipulator according to the present invention.

A manipulator 5 of the present embodiment is one in which a function of detecting that the object 901 contacts the end effector 102 is added to the manipulator 4 of the third embodiment.

Figure 13A:
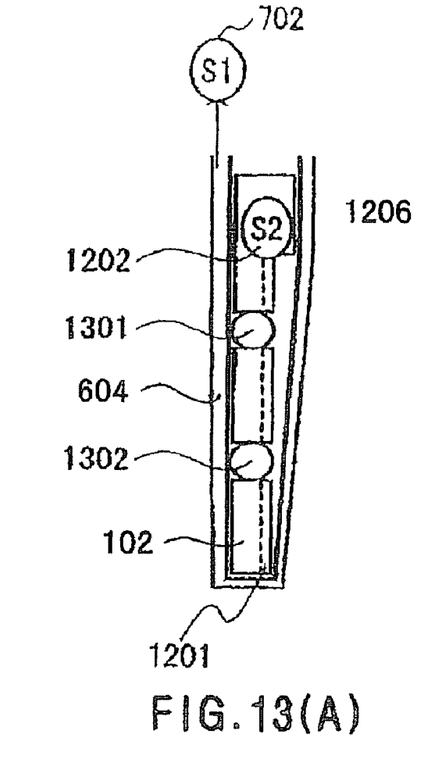
FIGS. 13A to 13D are partially enlarged views of the fourth embodiment of the manipulator according to the present invention.
Figure 13B:
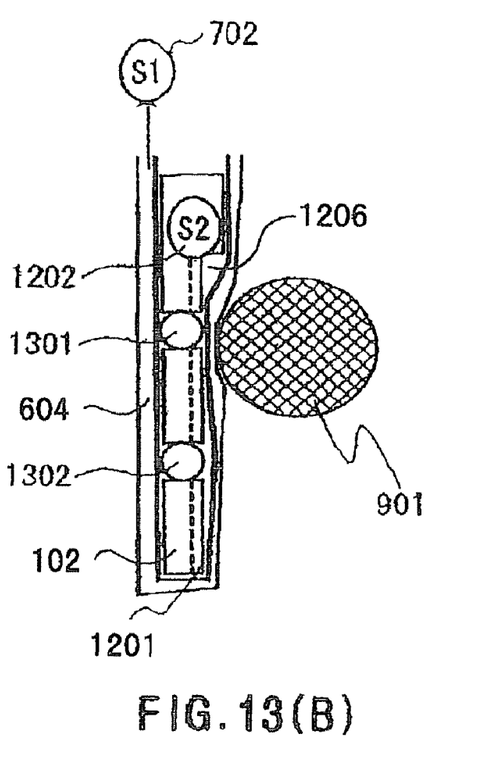
Figure 13C:
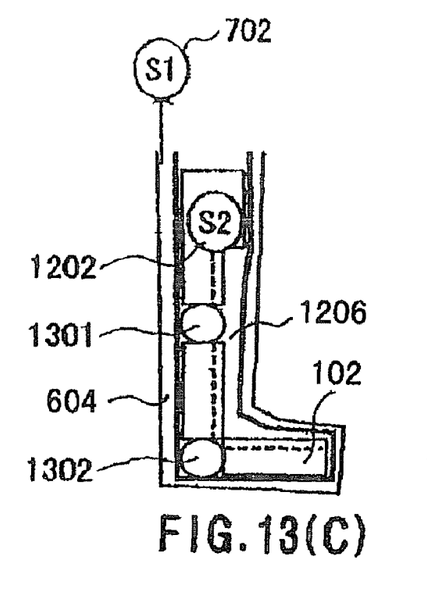
Figure 13D:
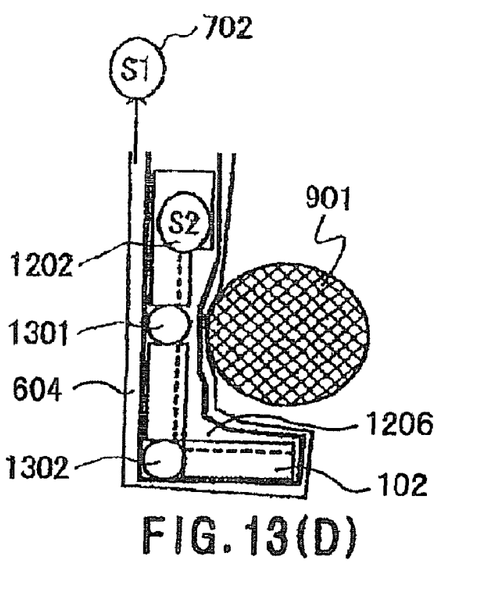
Figure 14A:
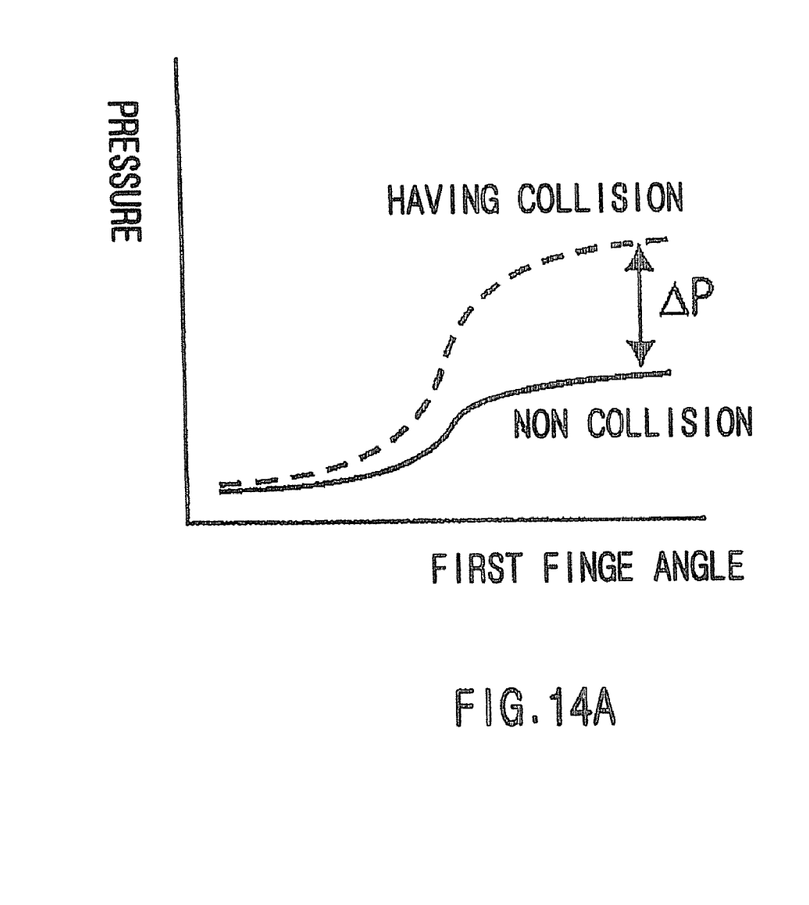
FIGS. 14A and 14B are views showing detection of a contact of an object in the fourth embodiment of the manipulator according to the present invention.
Figure 14B:
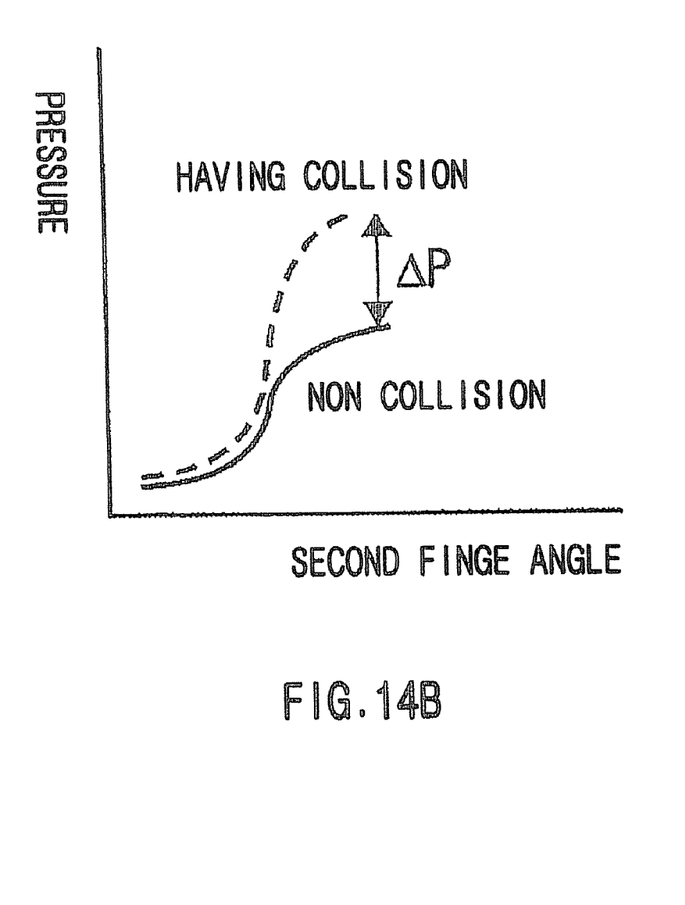

The following will explain the details with reference to FIGS. 12 to 14.

At least part of the support member 101 and the end effector 102 are covered with the inner cover 706. The support member 101 is provided with the pressure sensor 702 for detecting the pressure in the second space 604. In the passage 704 for communicatively connecting the external world and the second space 604, there is provided the pressure adjusting means 703. The opening 705 as one of the openings of the passage 704 is opened at a position communicating with the second space 604.

The support member 101 is provided with a pressure sensor 1202 for detecting the pressure in a third space 1206 between the end effector 102 and the inner cover 706. The pressure sensor 1202 communicates with the third space 1206 through a passage 1201 provided in the end effector 102. The passage 1201 is provided in such a manner that the pressure in the third space 1206 can be detected by the pressure sensor 1202 even when a posture of the end effector 102 is changed.

In the end effector 102 of the robot hand, even when the finger of the hand is stretched as shown in FIG. 13A or the finger of the hand is bent as shown in FIG. 13B, the pressure sensor 1202 detects contact of the object 901.

In order to detect the contact of the object 901 with the end effector 102 of the robot hand, relations among an angle of a first joint 1301 of a finger of the robot hand, an angle of a second joint 1302 thereof, an output of the pressure sensor 702 and an output of the pressure sensor 1202 are stored in form of a database or functions in advance.

For example, if the output of the pressure sensor 702 is S1, the angle of the first joint 1301 is φ1 and the angle of the second joint 1302 is φ2, their relation can be expressed as follows.

$$S1 = f(\phi1, \phi2)$$

Moreover, for example, if the output of the pressure sensor 1202 is S2, the angle of the first joint 1301 is φ1 and the angle of the second joint 1302 is φ2, their relation can be expressed as follows.

$$S2 = g(\phi1, \phi2)$$

Here, f and g represent functions.

Since relations among the angle of the first joint 1301 φ1, the angle of the second joint 1302 φ2, the output S1 of the pressure sensor 702 and the output S2 of the pressure sensor 1202 are stored as the database or the functions, when the object 901 comes in contact with the end effector 102, the manipulator 5 detects the contact by detecting a difference (ΔP in FIGS. 14A and 14B) between: a relation among actual outputs of the pressure sensors 702 and 1202; and the stored data in the database or the stored functions that describe the relation among angles of the first and second joints 1301 and 1302, and an output of the pressure sensor 1202.

As explained above, the manipulator 5 according to the fourth embodiment of the present invention has an effect of detecting that the object 901 contacts the end effector 102 regardless of the posture of the end effector 102, in addition to the same effect as in the third embodiment of the present invention.

The above has explained the embodiments of the present invention with reference to the specific examples. However, the present invention is not limited to the aforementioned embodiments. For example, a combination of any two or more embodiments described relating to FIGS. 1A to 14 in a technically possible range is included in the scope of the present invention.

Namely, the present invention is not limited to the aforementioned embodiments and can be variously modified without departing from the scope of the present invention, and they are all included in the scope of the present invention.

What is claimed is:

1. A manipulator comprising:
   an end effector that performs a mechanical work on a work subject;
   a support member that supports the end effector;
   an expandable and contractible fixing member provided to the support member and having a first space; and
   first fluid supply means for supplying a fluid to the first space,
   wherein the manipulator is configured to fix a flexible cover for covering the end effector to the support member by supplying the fluid to the first space to increase a size of the fixing member.

2. The manipulator according to claim 1, wherein the fixing member is made of a tube-shaped flexible film and is provided to seal between the flexible film and the support member.

3. The manipulator according to claim 1, further comprising:
   a fluid passage, and
   a valve, wherein
   a second space is formed between the flexible cover and one of the end effector and the support member,
   the fluid passage communicates with the first space and the second space, and
   the valve is used to change a communication state between the first space and the second space.

4. The manipulator according to claim 3, further comprising second fluid supply means for supplying the fluid to the second space.

5. The manipulator according to claim 4, further comprising a pressure sensor for measuring pressure in the second space.

* * * * *